United States Patent
Kliment et al.

[15] 3,689,634
[45] Sept. 5, 1972

[54] PROTRACTED ACTIVITY ORAL HYDROGEL BEAD

[72] Inventors: Karel Kliment, Princeton, N.J.; Jiri Vacik, Prague; Zdenek Ott, Prague; Vladimir Majkus, Prague; Miroslav Stol, Prague; Vladimir Stoy, Prague; Otto Wichterle, Prague, all of Ceskoslovenska

[73] Assignee: Ceskoslovenska Akademie ved, Prague, Czechoslovakia

[22] Filed: Sept. 23, 1970

[21] Appl. No.: 74,905

Related U.S. Application Data

[63] Continuation-in-part of Ser. No. 607,637, Jan. 6, 1967, Pat. No. 3,551,556.

[30] Foreign Application Priority Data

Feb. 9, 1966 Czechoslovakia...........838/66

[52] U.S. Cl. .......................424/21, 424/19, 424/227
[51] Int. Cl. ..............................................A61k 27/12
[58] Field of Search..........................424/19–22, 81

[56] References Cited

UNITED STATES PATENTS 3,551,556  12/1970  Kliment et al. ..............424/21

*Primary Examiner*—Shep K. Rose
*Attorney*—Richard Low and Murray Schaffer

[57] ABSTRACT

Drugs are released gradually to a living organism after oral ingestion, through a layer of non-ionogenic, neutral hydrogel of a polymer of ethylene glycol methacrylate or similar monomer cross-linked sufficiently to make the polymer insoluble in all gastro intestinal liquids.

5 Claims, No Drawings

PROTRACTED ACTIVITY ORAL HYDROGEL BEAD

This is a continuation-in-part of Ser. No. 607,637, filed Jan. 6, 1967 now U.S. Pat. No. 3,551,556 priority from Czechoslovakian application PV 838/66, filed Feb. 9, 1966.

In some applications, biologically active or physiologically active substances such as drugs must be delivered gradually and, as far as possible, continuously to the tissue or to the blood stream.

It has been proposed to use soluble linear polymers as drug carriers, the drugs being bound to the polymer by ionic or coordination bonds. There were also tested water-soluble polymers having drug molecules bound to the macromolecular chains by covalent bonds.

There were also proposed polymeric salts of basic antibiotics, such as tetracycline with water soluble anion exchangers, e.g. with linear polyacrylic and polymetacrylic acids. It is a common disadvantage of all linear polymers whose main chain entirely consists of carbon atoms that they resist anzymatic decomposition. They are therefore accumulated mainly in lymphatic glands.

All water-soluble macromolecular drug carriers are incapable of penetrating the cell membranes and thus accumulate mainly in lymphatic glands. This is advantageous only for treating infectious diseases of said glands but not for treating other organs. Water-soluble macromolecular drug carriers have therefore not found broad use in human medicine.

The object of the invention is the provision of polymeric carriers for biologically active substances which are fully insoluble in the liquids of the body, but strongly swell therein. Biologically active substances are not usually bound chemically to the carrier of the invention and enter the organism by physical processes, i.e. by dissolution or diffusion. The carriers according to the invention are three-dimensional hydrophilic polymers, either homogneous or heterogeneous, physiologically inert and thus innocuous. A typical example is copolymer of glycol methacrylate, cross-linked with a small amount, from about 0.1 to about 5 percent of glycol dimethacrylate, whereat "glycol" means not only ethylene glycol, but also polyglycols, copolymers of ethylene or polyethylene glycols with propylene glycol, and other water soluble dihydric alcohols. Glycolmonomethacrylate or glycolmonoacrylate can be partly or fully replaced by other neutral hydrophilic, physiologically inert monomers such as methacrylamide or acrylamide. Glycols can be, if desired, partly or fully replaced by other polyols such as glycerol, mannite, or pentaerythritol. Glycol dimathacrylate can be replaced by any other suitable sufficiently hydrophilic cross-linking agent such as by a low-molecular polyester of an unsaturated dicarboxylic acid, e.g. maleic or itaconic acid, or by N,N'-methylene-bis-methacrylamide or similar.

Biologically active substances can be absorbed by the polymeric hydrophilic carrier or freely deposited in any place therein, e.g. in its center, either as a solid or as a dispersion, or in the form of a solution. In contact with living tissue, a mucous membrane or skin, the biologically active substances diffuse gradually into the body. The amount of the active substance penetrating into the organism in a given time unit can be determined in advance according to the known, measured diffusion rate, the thickness of the polymer layer, the size of the contact surface and the concentration difference. The diffusion rate is influenced by the structure of the polymer, particularly by the crosslinking degree and the presence or absence of visible pores (macroporosity). The structure can be changed by choosing the conditions of polymerization.

The carriers can be implanted subcutaneously, constitute a part of a prosthesis, or inserted in a cavity of the human body. A planary carrier body of the invention may be placed in contact with skin, with a mucous membrane or with surface wounds. If an implant of the invention is readily accessible, the physiologically active substance, when exhausted, can be replenished by using a hypodermic needle. In this way it is also possible to use two or more different active substances sequentially.

Physiologically active substances which can be applied with the carriers of the invention include antibiotics, disinfectants, chemotherapeutics, hemostatics, cytostatics, hormones and other preparations for external or internal use.

Granular non-ionogenic, neutral, insoluble hydrogels of the invention which are capable of swelling, are suitable particularly for oral or, in some cases, also for intramuscular application. When used with a well defined and previously determined grain size distribution, a desired release rate of the biologically active substance during the dwell of the carrier in the body or in contact therewith can be achieved.

The hydrogels of the invention are cross-linked and thus insoluble. They are hydrophilic and capable of receiving at least 5 percent of water in human gastro-intestinal tract. When still capable of swelling a granular carrier is not in equilibrium with water or with the liquids of the gastro-intestinal tract when ready for oral application.

The rate at which physiologically active substances are released depends, under otherwise constant conditions, on the grain size, i.e. on the ratio between the surface and the volume of the particle. Small grains release the sorbed substance sooner than the large ones. The maximum of concentration is also reached sooner, and the substance is sooner exhausted.

Assorted sets of granules are prepared by means of sieves, the granules are saturated with the biologically active substance and its descrption is determined experimentally. For instance, a solution of a drug containing radioactive isotopes is soaked into individual fractions which are placed in the stomach of experimental animals. Then the concentration in the blood is measured over the entire period, in which the carrier remains in the gastro-intestinal tract of the animal.

In this way, curves of concentration vs time are obtained for all fractions. From these curves an optimal curve corresponding to a desired effect is composed either by computing or by a geometrical construction, yielding the percentual amounts of single fractions which are to be mixed in order to obtain the desired curve.

It is important to introduce the hydrophilic cross-linked carrier into the gastro-intestinal tract or into a muscle in a state in which it is till capable of swelling so that the concentration of the released drug decreases slowly or if the swelling capacity is great enough, increase from an initial comparatively low value to a maximum. By choosing the distribution according to a predetermined schedule it is possible to obtain any desired change of concentration with time.

For intramuscular application granular gels of the invention may be suspended in oil or in glycerol, or even in aqueous solutions, if the carrier is previously saturated with e.g. glycerol and the aqueous suspension is prepared immediately before the application.

For applications in which the carrier according to the invention makes direct contact with living tissue or mucous membranes other than those of the gastro-intestinal tract, it is advantageous to provide an outer layer of a neutral, non-ionogenic hydrogel such as the copolymer of a clycol methacrylate or acrylate with a small amount of a neutral cross-linking agent such as glycol bis-methacrylate. Neutral, inert hydrogels are easily tolerated by the organism.

By combining a plurality of predetermined sized particles it is possible to obtain a desorption rate conforming to any biological requirement. The desorption rate can be determined by any suitable method, as for example, by fractioned desorption and determination of the active biological substance itself or by polarographically or by any other analytical method. The test desorption may be carried out at conditions similar to that which occurs in a living body. Clinical testing can be carried out by known methods which do not introduce noxious substances such as radioisotopes into the organism. Usual methods are e.g. spectrophotmetry, chromatography, coagulation test (Quick-test), biological test, carried out with samples of blood or blood serum. The state of being capable of swelling mentioned above can be entirely replaced by a state, in which the hydrogel, swollen with a non-aqueous liquid, is exposed to the action of juices of the gastro-intestinal tract, whereby the orignal swelling agent is gradually replaced by water or by aqueous solutions. Thereby it is possible to modify the desorption curves in comparison with hydrogel grains which have only been dried. Generally, the condition at which an initial low concentration of the desorbed active substance rises to a maximum value can be called r e t a r d a t i o n of desorption. Such retardation can be achieved e.g. by drying the granular carrier together with the biologically active substance absorbed therein, or by swelling the carrier before or after the impregnation with the active sustance with a suitable swelling agent mixible with water or capable of being displaced by water, such as with glycerol, ethyl urethane or formamide. The retardation can be also achieved by saturating the carrier, already containing the active substance, with an electrolyte such as sodium chloride. The biologically active substance is thereby either transformed into an oversaturated solution or precipitated. In any case its desorption and elution by the gastric and intestinal juice is slowed down at the beginning, so that the elution does not follow the usual exponential curve beginning with a maximum, but rises, on the contrary, from an initial minimum to a maximum, from which the curve—at any single traction—sinks again exponentially to zero. By a suitable combination of fractions the desorption curve can obtain any desired shape and the maximum can be protracted or risen as desired. The elution rate depends, of course, also upon the nature of the active substance.

In this embodiment with chosen grain size distribution it is also possible to replace the non-ionizable cross-linked hydrogels by physically similar hydrogels containing also ionizable groups.

This is advantageous particularly if the active substance is either acid or basic. Then, the biologically active substance is changed by the juices of the digestive tract—which are acid in the stomach and basic in the duodenum—to a form having different solubility, e.g. from a low-soluble base to a well soluble salt, or, on the contrary, form a well soluble salt to an insoluble base. Thus, it is possible to localize the action of the drug or of another active substance either onto the stomach or onto the duodenum or the small intestine, without using preserving layers of well known drug tablets. The same effect is attained, however, even if the active substance has no basic or acid groups, by the different swelling degree of the ionogenic hydrogel. So, for example, if the biologically active substance has to act mainly onto the stomach with no or minimal effect in the intestines, one uses as a carrier an anion exchanger which swells strongly in acidic gastric juice and releases thus the active substance mainly in the stomach. The effect is, of course, even more outstanding if the substance itself is basic. If one uses, on the contrary, a cation exchanger as carrier, the swelling in the acid gastric juice is minimal or even reverse so that the active substance is not easily released. In the mild basic medium of the duodenum the swelling is, however, considerable so that the biologically active substance is from the swollen carrier rapidly desorbed, whilst it has got through the stomach almost without change. If the biologically active substance itself is acidic, the effect is even more pronounced because the substance is in the basic medium of the duodenum and small intestine rapidly converted to a well soluble salt.

The desorption rate of the biologically active substance from the hydrogel carrier can be influenced also by the presence of gegen-ions. If the active substance is non-ionogenic, the desorption rate-depends on the ionic state of the carrier, i.e. whether it is in the state of free acid or base, or converted into a salt, i.e. into sodium salt.

By combining all above mentioned factors it is possible to determine in advance the desorption rate regarding any desired place of the gastro-intestinal tract. Further factor, influencing the desorption rate, is the cross-linking degree, particularly with respect to the size of the molecules of the active substance. Moreover, it is possible to use the hydrophilic carrier also in a macroporous form, using a "porofor" which is present during the polymerization or copolymerization. Such porofors are e.g. inert liquids separating during the polymerization as a separate phase, or soluble (linear) polymers which can be subsequently washed out from the copolymer. The "visible" pores increase strongly the active surface of the carrier and thus also the desorption rate of the active substance.

All these factors can be mutually conbined by anybody skilled in the art so as to reach optimum effect for any particular case, using common knowledge of polymerization and that of sorption and desorption phenomena.

For the purposes of the present invention it is possible to use not only the known non-ionogenic neutral hydrogels such as sparingly cross-linked copolymers of glycol monomethacrylates with 0.1–2.0 percent of glycol-bis-methacrylates, or known ion exchangers or combinations thereof such as copolymers of glycol-methacrylates with methacrylic acid and a small amount of glycol bis-methacrylate, but also other known hydrogels such as complexes of strongly acid soluble polymers with strongly basic soluble polymers in any mutual ratio. It is to be understood, however, that ion-exchangers for oral application are claimed only in assorted sets of single previously separated fractions obtained by sieving, whilst for any other surgical application neutral non-ionogenic cross-linked hydrogels and/or ion-exchangers are claimed as carriers of biologically active substances, with or without fractioning them according to the particle size. The shape and size of the carrier is, however, in any case intentionally chosen so as to secure the concentration vs time dependence determined in advance by physico-chemical and/or biological tests. It is, however, impossible to state all imaginable particular cases of application because the shape or the desorption curve is determined by the actual state of medical knowledge, regarding the treatment of single diseases, by individual properties and condition of the patient and, naturally, also by the properties of any used drug or other active substance. The above mentioned disclosure in connection with the following examples yields, however, clear directions for using the invention and sufficient working instruction for a routine solving of other examples which cannot be all described here. The term "sieving" is not restricted to using sieves, it means also other known methods of separation of fractions according to the size and/or weight such as air separating, controlled sedimentation, etc.

EXAMPLE 1

One gram chloramphenicol was dispersed in 2 ml of redistilled water and 0.72 ml of the dispersion was added to 4 ml of a mixture of 30 parts of ethylene glycol monomethacrylate containing 0.3 percent of ethyleneglycol bis-methacrylate, and 20 parts of diethylene glycol monomethacrylate. Then 0.25 ml of dimethylaminoethyl acetate and 0.03 ml of an aqueous 40 percent ammonium persulfate solution, were added with stirring. 4.5 ml of this mixture were left to to be polymerized in a glassmold 60 × 60 mm under carbon dioxide at room temperature. The copolymerization was completed in 15 minutes. A sample was cut out with a scalpel and transferred to a glass flask, under sterile conditions. It was then tested by the disc diffusion method for its microbiological effects.

The polymerization method can be modified by using other redox catalysts, or a peroxide alone such as di-isopropyl percarbonate which forms free radicals at temperatures above 50°. A large amount of water or of a hydrophilic liquid such as glycerol or ethyleneglycol can be added to the polymerization mixture. The ethyleneglycol bis-methacrylate may be replaced by another cross-linking agent such as N, N' - methylene-bis-methacrylamide, and the monomers can be partly or wholly replaced by methacrylamide or other hydrophilic monolefinic monomers as mentioned above.

EXAMPLE 2

A mixture of 70 percent distilled water and 30 percent ethylenglycol monomethacrylate, containing 0.24 percent of ethyleneglycol bis-methacrylate, was mixed with 0.5 percent of a 2-percent aqueous solution of ammonium persulfate and 0.1 percent dimethylaminoethyl acetate. Then 1.5 percent of an aqueous dispersion of chloramphenicol was added, the mixture was well stirred and poured into a flat glass mold blanketed with carbon dioxide. The mold was left for 3 hours at room temperature. The microporous sponge thus formed could be used for treating burns.

EXAMPLE 3

A tablet of 1-gamma-axobutyl-2,5-dioxo-3,4-diphenyl pyrazolidine (ketophenylbutazone), coated with a mixture of polyvinyl alcohol and glycerol which dissolves very slowly in the monomer mixture of Example 2, was held in the polymerizing mixture until it was coated with a 3–4 mm thick layer of microporous hydrogel. It was washed in 96 percent ethanol to remove residual polymerization initiator, dried in order to remove the alcohol, and shortly rinsed with a 0.8 percent aqueous solution of sodium chloride, under sterile conditions. The coated tablet was then implanted under the skin on the knee of a patient suffering from gout. The drug gradually dissolved, and its concentration in the region of the afflicted knee was much higher than in other parts of the body. When the drug was exhausted, after several weeks, it was replenished by injecting an aqueous suspension of the same into the hydrogel implant which was removed after the cure. The same result could have been obtained by oral application of at least 20 tablets of the same drug at the risk of an undesired decrease in the amount of red blood cells.

The mixture of polyvinyl alcohol and glycerol is prepared at elevated temperature, polyvinyl alcohol precipitating as a fine suspension when the mixture is cooled. Other suitable polymers dissolving or swelling in water but insoluble in organic solvents, such as gelatine, carboxymethyl cellulose and other harmless natural or synthetic polymers can be used instead.

EXAMPLE 4

A spongy hydrogel was prepared according to example 2, squeezed out and soaked in a concentrated aqueous solution of tetracycline hydrochloride. Then a cut and weighed piece of impregnated sponge is coated with a thin polyvinyl alcohol layer in the manner described in Example 3 and suspended means of a thread of carboxymethyl cellulose in a glass mold, which is then filled with a mixture of 55 percent ethylene-glycol monomethacrylate, 20 percent diethyleneglycol monomethacrylate, 0.3 percent ethyleneglycol bis-methacrylate, 0.8 percent of a 2 percent aqueous potassium persulfate solution, 0.5 percent of a 2 percent aqueous solution of potassium pyrosulfite, 0.01 percent of 0.1 percent aqueous copper sulfate (pentahydrate) solution and 23.39 percent of distilled water. The mixture polymerized readily under an inert atmosphere at room temperature. The mold with the polymerized mixture is then immersed in ethanol whereby the polymer is released from the mold and the residual catalyst is washed out. Ethanol is removed either by evaporation or by immersion of the hydrogel in cold water. Prior to subcutaneous implantation, the hydrogel body is summersed in physiological salt solution. The entire procedure is carried out under sterile conditions. The diffusion rate of the antibiotic depends on the thickness of the surface layer of transparent hydrogel.

EXAMPLE 5

A large crystal of Glauber's salt (sodium sulfate dekahydrate) is embedded in a polymerizing of 75 percent ethyleneglycol monomethacrylate, 0.3 percent ethyleneglycol bis-methacrylate, 0.25 percent di-isopropyl percarbonate and 24.5 percent anhydrous glycerol, at 55°–60° C under carbon dioxide. After copolymerization, the mold with the copolymer is immersed into hot water and thoroughly washed. Into the cavity left by the dissolved crystal a suspension of a hormone is introduced by means of a syringe. The sterile body, brought to equilibrium with a sterilized physiological salt solution, is implanted under the skin to produce effects for exhaustion of several months. After the hormone, another dose of biologically active material can be injected into the same cavity in the implant after removal of body liquid therefrom by suction.

EXAMPLE 6

20–30 layers of gauze of the type used for dressings are soaked with a mixture of 40 percent ethylene glycol monomethacrylate, 0.2 percent ethyleneglycol bis-methacrylate and 59.8 percent distilled water freshly mixed with 0.5 percent each of a 4 percent aqueous potassium pyro-sulfite solution and of a 4 percent aqueous potassium persulfate solution. The precedure is carried out in a closed glass case filled with carbon dioxide, by means of rubber sleeves and gloves covering the hands of the operator. The impregnated gauze is laid onto a positive plaster molding of a face after the viscosity of the mixture rises sufficiently to avoid dripping. After the polymerization the gauze obtained is filled with spongy hydrogel, which, after having been washed and squeezed out, is capable of holding a considerable amount of biologically active substances for treating skin diseases and for cosmetic purposes.

EXAMPLE 7

A polymerization mixture according to Example 6 is poured onto flat glass mold and left to polyermize under an inert gas at room temperature. After having been thoroughly washed and squeezed out, the spongy hydrogel is impregnated with an aqueous or alcoholic solution of a biologically active substance such as cortisone or an overial or androgenic hormone. The foil of appropriate size, about 10 mm thick, is placed under an elastic dressing e.g. on the inner side of a thigh. In the same way some neoplastic skin diseases can be treated with 6-azauridine riboside. After some time the spongy hydrogel can be washed again, sterilized in boiling water, squeezed out under sterile conditions, soaked again in a biologically active substance and re-used for the same or for another patient.

EXAMPLE 8

A porous hydrogel capable of exchanging cations is prepared by copolymerizing a mixture of 35 parts of methacrylic acid, and 30 parts of a 25 percent aqueous solution of maleic anhydride. The copolymerization is carried out in the absence of free oxygen with redox initiator consisting of 5 parts of a 5 percent ammonium persulfate aqueous solution and 2 parts of dimethylaminoethyl acetate. After having been washed in 5 percent hydrochloric acid and several times in distilled water the squeezed out porous hydrogel can be soaked in a solution of basic drug, e.g. oxytetracycline, whereby a part of the drug is bound by ionic bonds, the remainder being absorbed and adsorbed. The impregnated porous spongy hydrogel is then coated with polyvinyl alcohol or gelatine and embedded in a transparent hydrogel prepared according to Example 5. After having been washed in 96 percent ethanol and then in sterile physiological salt solution the body is implanted for delivering the drug into the blood stream. The drug concentration soon reaches a maximum and then decreases according to a flat logarithmic curve.

EXAMPLE 9

A copolymer is prepared from 97 parts of ethylene glycol monomethacrylate, 2 parts of methacrylic acid and 1 percent of ethylene glycol bis-methacrylate by suspension-polymerization in a concentrated, aqueous solution of sodium chloride, using 0.05 parts of di-isopropyl percarbonate as a polymerization initiator. The copolymer beads, 0.1 to 2.0 mm is size, are thoroughly washed and then soaked in a saturated aqueous solution to tetracycline hydrochloride. After a week, when even the largest particles have reached equilibrium with the solution, the surplus solution is centrifuged or sucked off and the polymer is dried at low pressure and 40° C. The polymer is then divided by means of calibrated sleeves into three fractions: I (0.1–0.5mm), II (0.5–1mm), III (1–2mm). To obtain protracted activity through the entire gastro-intestinal tract after oral application, a mixture of 1 part of I, 0.5 part of II and 3 parts of III is used.

To obtain a more exact dosing, it is advantageous to divide the polymer into a higher number of ractions which should be almost monodispersed, i.e. they should be almost homogeneous as to their molecular weight, with only a small number of molecules in each fraction differing markedly from the average value. It will be also advantageous to remove those particles which are too large or irregular. The drying should be advanateously carried out at conditions which avoid any aggregation of partices, e.g. in suspension is a heated gas, e.g. nitrogen, driven through a sieve-bottom.

The invention should not be restricted by the above examples which are only illustrative. It is apparent that through a porous hydrogel the active substance will diffuse at a higher rate than through a homogeneous one. Thus, the structure and the thickness of the hydrogel layer through which the active substance has to penetrate into the living tissue, and also the place where the carrier is applied, are chosen according to the solubility and activity of the active substance, in order to secure the optimum, previously determined dependence of concentration on time. The carrier, either in the form of a single shaped body or in the form of granules having a definite size-distribution characteristic, forms a barrier through which the biologically active substance has to penetrate by diffusion, the rate of diffusion being either established by an experiment in vitro or in vivo, or computed on the base of known solubility of the active substance and the permeability of the hydrogel.

It is to understood that granular carriers intended for treating diseases of the gastro-intestinal tract can also be coated with known acid-resistant coating.

The carriers according to the invention can be also used in suitable shapes as inert intravaginal or intrauterinal pads containing antibiotics, desinfectants and also anticonception agents..

In the treatment of local tuberculosis of bones or glands a carrier according to the invention may be impregnated with a tuberculostatic agent such as nicotinic acid hydrazide or p-amino salicylic acid, and implanted in the neighbor hood of the sick organ in order to provide as high concentrations of the drug in the center of the disease as is possible, without flooding the whole organism with the same. Such high local concentrations of the drug are not possible without toxic effects on other organs, such as the kidneys by oral or conventional paranteral application.

It has been found that substances having a molecular weight up to 1,000 are capable of penetrating by diffusion the sparingly cross-linked glycol methacrylate hydrogel of the present invention and readily capable of being liberated into the surrounding aqueous medium. However, biological substances having a molecular weight of over 1,000 could not diffuse through the hydrogel or be liberated from it *unless* the hydrogel itself was prepared with the biological substance as an integral part of the polymerization mixture.

In a series of experiments, water soluble organic dyestuffs were chosen having a molecular weight about 300 to 700. The diffusion rate of such materials was assumed to be roughly inversely proportional to their molecular weight, with differences caused by the individual shape and conforming conditions of the dye. Thus the dyes were divided in three series A, B and C, according to their structural types.

EXAMPLE 10

Glycol methacrylate hydrogel was prepared by free radical polymerization from a mixture comprising; 70 parts by weight of ethylene glycol monomethacrylate (2-hydroxyethyl methacrylate), containing 0.09 percent of the respective dimethacrylate as cross-linking agent, 29.9p. of ethylene glycol and 0.1 p. of d-isopropyl percarbonate as initiator. The mixture was heated at 65° C for 2 hours under pure carbon dioxide in test tubes, diameter 20 mm, length 180 mm. The block of the hydrogel in each test tube was 30 mm high.

The test tubes with gel blocks were then immersed in to a large excess of distilled water to remove the ethylene glycol thereof. The washing lasted one month, the water being exchanged each week. Finally, the test tubes with the gel blocks were boiled off in distilled water for 8 hours and left to cool to room temperature in the bath.

Into each test tube 20 ml of a 0.05 molar solution of the respective dyestuff in water was poured, the test tubes were stoppered with rubber stoppers and kept standing. From that instant the diffusion of the dyestuffs into the gel begun. After 1,000 hours at room temperature (23°±2° C), the diffusion paths, i.e. the distance of the boundary between the clear and stained gel from the surface, were measured. The results are contained in Table 1.

TABLE 1

| Model Substance | Molecular Weight | Diffusion Path, mm |
|---|---|---|
| Structural type A | | |
| xylenol orange (indicator) | 673 | 7.5 |
| bromophenol red (indicator) | 512 | 11 |
| methylene green | 365 | 16.5 |
| Structural type B | | |
| alkali blue 6B | 620 | 2 |
| thymol blue | 467 | 7 |
| chlorophenol red | 423 | 7 |
| cresol red | 382 | 10 |
| methyl red | 291 | 12.5 |
| Structural type C | | |
| congo red | 697 | 4.5 |
| bromothymol blue | 624 | 5 |

It will thus be seen that the diffusion path for each of the structural types decreases markedly with the increase in molecular weight. By extrapolating the results to a zero length of the diffusion path to the molecular weight limit it can be determined specifically at what weight the substances can no longer penetrate the hydrogel. The maximum value is about 1,000.

In the second series of experiments, carried out with heparine (mol. weight from 8 to $16 \cdot 10^3$, compare Barlow G. H. et al., Arch. Biochem. Biophys. 84,518 (1961); Larent T. C., ibidem 92,224 (1961)), it was proved that substances with average molecular weight higher than 1000 did not penetrate the pure gel at all, but did diffuse through a gel, if it had been polymerized with the substance as part of its monomer mixture. Of course, the substance has to possess hydrophilic character so that it can be extracted by water or by aqueous body liquids.

EXAMPLE 11

The glycol methacrylate gel for these experiment was prepared by polymerizing a mixture comprising; 66.5 p. of ethylene glycol monomethacrylate (containing 0.1 percent of the respective dimethacrylate), 28.5 p. of distilled water, 3,3 p. of dimethylamino ethyl acetate, 0.7 p. of ammonium persulfate (in the form of a 40 percent aqueous solution). The polymerization on a horizontal plate lasted 2 hours at 23° C, carbon dioxide having been used as inert gas. From a 1 mm thick foil 60 × 60 mm large, small discs with 5 mm diameter were cut.

A 1 percent aqueous solution of heparine was prepared and discs of the hydrogel material immersed therein for 24 hours. The discs were then rinsed with distilled water and immersed in pure distilled water. No trace of heparine could be found in the water after 2 days. Thus it was shown that substances having a molecular weight in excess of 1,000 could not be absorbed or diffused into the hydrogel where the hydrogel is not formed with the substance as part of the polymerization mixture.

EXAMPLE 12

The glycol methacrylate gel of example 11 was reproduced with the addition of 1 part of heparine to the polymerization mixture. The discs were then eluated by water and the water extract was analyzed for heparine, using metachromate with toluidine blue and determining its concentration photocolorimetrically. During 24 hours extraction by distilled water the heparine content in the hydrogel decreased by about 20 percent.

A 1 percent aqueous solution was again prepared and discs of the hydrogel containing heparine in the polymerization mixture were immersed therein for 24 hours. After immersion the discs were rinsed and immersed in pure distilled water for two days. After two days considerable amount of heparine was found in the pure distilled water. Consequently it is shown that substances having molecular weight of about 1,000 or greater are freely liberated from or absorbed by hydrogels when the substance is part of the polymerization mixture.

While the exact mechanics of this phenomenon is not known, apparently, the microstructure of the hydrogel is changed by the presence of the higher molecular substance so that the interstices between macromolecular chains are widened accordingly. By experimentation it can be shown that the ability to liberate substances with comparativley high molecular weight is increased by from 8 to 16 times if the substance was present in the polymerizing mixture. The gels formed according to example 12 are suitable for dressings, tissue transplant, subcutaneous implant, and in fact, for all used previously described.

This effect as aforedescribed forms an important advantage over the known methods disclosed in the prior art which are confined to the use of simple, low-molecular compounds. Many biologically active substances possess molecular weight higher than 1,000, in which cases the known method fail to permit absorption or liberation of the substance in use, while the present method succeeds. Moreover, the hydrogels prepared in the presence of higher molecular compounds keep their permeability for the same permanently, because the cross-linked structure is stable. This allows the hydrogel to be refilled, or reabsorb the biologically active substance providing also a gel which may be readily implanted and refilled, by hypodermic syringe in situ without the need for successive periodic reimplantation. Even lower molecular compounds, which are capable to penetrate the hydrogels, diffuse at a considerably higher rate through hydrogels that have been prepared in the presence of compounds with large molecules. The capacity of the hydrogel for the biologically active substances is thereby also increased.

What is claimed is:

1. An insoluble oral dosage unit form carrier of biologically active, at least partly soluble substances, for oral ingestion to obtain protracted activity through the gastro-intestinal tract after oral ingestion, comprising a mixture of at least two calibrated sieved dried fractions of substantially different grain sizes of dried copolymer beads of sparingly cross-linked hydrogels prepared in copolymer bead form by suspension copolymerization with a polymerization initiator, in a concentrated aqueous sodium chloride solution, of hydrophilic mono-olefinic monomers selected from the group consisting of ethylene glycol monomethacrylate, ethylene glycol monoacrylate, polyethylene glycol monomethacrylate, polyethylene glycol monoacrylate, monomethacrylates and monoacrylates of ethylene glycol-propylene glycol copolymers, methacrylamide, acrylamide, and mixtures thereof, with 0.1–5.0 percent of cross-linking agents selected from the group consisting of ethylene glycol bis-methacrylate, N,N'-methylene bis-methacrylamide, and low-molecular polyesters of maleic acid and itaconic acid, and soaking said copolymer beads in a saturated aqueous solution of a biologically active oral therapeutic substances, drying the bead particles after they have reached equilibrium with the solution, and dividing said beads into said three fractions by means of calibrated sieves and admixing said three parts of the three fractions together to form an oral dosage unit form said mixture of copolymer beads consisting of said three differently sized bead particles in said predetermined proportions to secure a controlled gastro-intestinal delivery of the biologically active oral therapeutic substance according to a predetermined protracted activity schedule.

2. The carriers according to claim 1 wherein said particles comprise a core consisting of said beads as a macroporous hydrogel containing the saturated biologically active oral therapeutic substance, and an outer inert acid resistant coating layer, said carriers intended for treating diseases of the gastro-intestinal tract.

3. The carrier according to claim 1 wherein said thickness and diffusion rates are predetermined and predefined to provide a controlled delivery for tetracyline hydrochloride from each particle.

4. The carrier according to claim 3 wherein said tetracyline hydrochloride as the biological substance comprises about 1 percent of said mixture.

5. The carrier according to claim 1 wherein said mixture comprises fractions of one part 0.1 – 0.5 parts of 0.5 – 1 mm and three parts of 1 – 2 mm beads prepared in bead form 0.1 – 2.0 mm in size.

* * * * *